United States Patent
Zhong et al.

(10) Patent No.: US 12,470,526 B2
(45) Date of Patent: Nov. 11, 2025

(54) DATA TRANSMISSION METHOD AND APPARATUS

(71) Applicant: Shenzhen Yinwang Intelligent Technologies Co., Ltd., Shenzhen (CN)

(72) Inventors: Steven Yin Zhong, Singapore (SG); Xinxing Yin, Shanghai (CN); Mingming Zhang, Shanghai (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 247 days.

(21) Appl. No.: 17/973,767

(22) Filed: Oct. 26, 2022

(65) Prior Publication Data
US 2023/0067338 A1 Mar. 2, 2023

Related U.S. Application Data

(63) Continuation of application No. PCT/CN2020/112114, filed on Aug. 28, 2020.

(51) Int. Cl.
*H04L 9/40* (2022.01)
*H04L 67/12* (2022.01)

(52) U.S. Cl.
CPC ........ *H04L 63/0428* (2013.01); *H04L 63/123* (2013.01); *H04L 63/20* (2013.01); *H04L 67/12* (2013.01); *H04L 2212/00* (2013.01)

(58) Field of Classification Search
CPC ... H04L 63/0428; H04L 63/123; H04L 63/20; H04L 67/12
See application file for complete search history.

(56) References Cited

U.S. PATENT DOCUMENTS

| 10,009,325 | B1 | 6/2018 | David et al. |
| 2018/0131522 | A1 | 5/2018 | Lawlis et al. |
| 2019/0207915 | A1* | 7/2019 | Schaap ................ H04L 9/0891 |
| 2019/0207950 | A1 | 7/2019 | Mohammed et al. |

(Continued)

FOREIGN PATENT DOCUMENTS

| CN | 106549940 A | 3/2017 |
| CN | 108965218 A | 12/2018 |

(Continued)

OTHER PUBLICATIONS

Woo et al. (A Practical Security Architecture for In-Vehicle CAN-FD, IEEE, vol. 17, No. 8, Aug. 2016, pp. 2248-2261) (Year: 2016).*

*Primary Examiner* — Oleg Korsak
(74) *Attorney, Agent, or Firm* — Conley Rose, P.C.

(57) ABSTRACT

A data transmission method includes: a first electronic control unit (ECU) that obtains to-be-sent data. The first ECU determines a protection policy corresponding to the to-be-sent data from a plurality of protection policies, where the protection policies include a plurality of different encapsulation formats for the to-be-sent data and at least two protection policies with different calculation amounts for processing the to-be-sent data. The first ECU encapsulates the to-be-sent data according to the protection policy corresponding to the to-be-sent data to obtain an encapsulated packet. The first ECU sends the encapsulated packet to a second ECU, where the first ECU and the second ECU are any two ECUs in a vehicle.

18 Claims, 6 Drawing Sheets

(56) References Cited

U.S. PATENT DOCUMENTS

| | | | |
|---|---|---|---|
| 2020/0092129 A1 | 3/2020 | Lin et al. | |
| 2020/0389469 A1* | 12/2020 | Litichever | H04W 4/40 |
| 2022/0094695 A1 | 3/2022 | Buffard et al. | |
| 2023/0156748 A1* | 5/2023 | Li | H04W 4/08 370/329 |

FOREIGN PATENT DOCUMENTS

| | | |
|---|---|---|
| CN | 108989024 A | 12/2018 |
| CN | 109672538 A | 4/2019 |
| CN | 110138624 A | 8/2019 |
| CN | 110377002 A | 10/2019 |
| CN | 110635893 A | 12/2019 |
| CN | 110912690 A | 3/2020 |
| EP | 3547191 A1 | 10/2019 |
| WO | 2018057321 A2 | 3/2018 |
| WO | 2018214487 A1 | 11/2018 |

\* cited by examiner

DATA TRANSMISSION METHOD AND APPARATUS

CROSS-REFERENCE TO RELATED APPLICATIONS

This is a continuation of International Patent Application No. PCT/CN2020/112114 filed on Aug. 28, 2020, which is hereby incorporated by reference in its entirety.

TECHNICAL FIELD

This disclosure relates to the vehicle field, and in particular, to a data transmission method and an apparatus.

BACKGROUND

As vehicle electrical systems such as in-vehicle infotainment, navigation, and assisted driving rapidly develop, data communicated through an in-vehicle network increases significantly. For example, the Institute of Electrical and Electronics Engineers (IEEE) 802.3 Ethernet technology with high throughput is introduced into a vehicle, and Ethernet gradually becomes a backbone network of the in-vehicle network.

Ethernet, as the backbone network, carries many communication services, for example, it carries a large amount of data, such as video on demand, software upgrade, monitored data upload, interactive control, and diagnosis. Security for transmitting data in the vehicle is of great significance in an in-vehicle communications environment. In a conventional solution, various types of security protection, such as integrity protection, anti-replay attack protection, or confidentiality protection, are performed on the data transmitted in the vehicle. However, heavy in-vehicle Ethernet traffic indicates a large calculation amount for data protection, which requires higher hardware performance to support the calculation amount. Therefore, how to effectively protect, on a premise of support of hardware performance, the transmitted data becomes an urgent problem to be resolved.

SUMMARY

Embodiments of this disclosure provide a data transmission method and an apparatus, to select an appropriate protection policy for to-be-transmitted data, and balance calculation resources of electronic control units (ECUs).

In view of this, a first aspect of this disclosure provides a data transmission method. The method includes a first ECU that obtains to-be-sent data, where the first ECU and a second ECU this disclosure are any two ECUs of a plurality of ECUs in a same vehicle. The first ECU determines a protection policy corresponding to the to-be-sent data from a plurality of protection policies, where the plurality of protection policies include a plurality of different encapsulation manners for the to-be-sent data, and the plurality of protection policies include at least two protection policies with different calculation amounts for the to-be-sent data, that is, required calculation amounts are different when the data is protected by using the at least two protection policies. The first ECU encapsulates the to-be-sent data according to the protection policy corresponding to the to-be-sent data, to obtain an encapsulated packet. The first ECU sends the encapsulated packet to the second ECU.

In this implementation of this disclosure, the first ECU can select, from the plurality of protection policies, the protection policy that matches the to-be-sent data, and can select an appropriate protection policy based on importance of the to-be-sent data. The plurality of protection policies can include protection policies with different calculation amounts. The calculation amount is a calculation amount required when the to-be-sent data is protected by using the protection policy. When importance of the to-be-sent data is higher, a calculation amount corresponding to the selected protection policy is usually higher. When importance of the to-be-sent data is lower, a calculation amount corresponding to the selected protection policy is usually lower. Matched protection policies can be selected for different data, so that calculation amounts of data transmitted between ECUs in the vehicle are balanced, data with higher importance can be protected to a higher degree, and a calculation amount for protecting data with lower importance is reduced. This can more effectively use calculation resources of the ECUs in the vehicle, and implement effective protection for the transmitted data on the basis of support of hardware performance in the vehicle.

The method provided in this disclosure can be applied to the vehicle. The vehicle includes the plurality of ECUs. The first ECU and the second ECU are any two ECUs of the plurality of ECUs, and the plurality of ECUs are usually connected through Ethernet.

In a possible implementation, that the first ECU determines the protection policy corresponding to the to-be-sent data from the plurality of protection policies may include that the first ECU determines the protection policy corresponding to the to-be-sent data from the plurality of protection policies based on an identifier included in the to-be-sent data, where the identifier included in the to-be-sent data includes an identifier of an ECU that generates the to-be-sent data or an identifier of a data type of the to-be-sent data.

In this implementation, an appropriate protection policy can be selected based on the ECU that generates the data or the data type of the to-be-sent data. In this way, matched protection policies can be selected for different types of data or the data generated by different ECUs, so that calculation amounts of data transmitted between ECUs in the vehicle are balanced, data with higher importance can be protected to a higher degree, and a calculation amount for protecting data with lower importance is reduced. This can more effectively use calculation resources of the ECUs in the vehicle.

In a possible implementation, if the identifier included in the to-be-sent data includes the identifier of the ECU that generates the to-be-sent data, that the first ECU determines the protection policy corresponding to the to-be-sent data from the plurality of protection policies based on the identifier included in the to-be-sent data may include that the first ECU determines a security level of the to-be-sent data based on the identifier and a mapping relationship, where the mapping relationship includes a relationship between an identifier of an ECU in the vehicle and a security level, and a security level corresponding to each ECU in the vehicle is determined based on a type of the ECU in the vehicle. The first ECU determines the protection policy corresponding to the to-be-sent data from the plurality of protection policies based on the security level.

In this implementation, the security level can be used to indicate importance of the to-be-sent data, and different types of ECUs have matched security levels. Therefore, a matched protection policy can be subsequently selected based on the security level, especially when there are increasingly more ECUs in the vehicle. A security level is allocated to each ECU based on a type of the ECU, and this can implement efficient management of the ECU in the vehicle, and improve data transmission efficiency. In addition, each security level has a matched protection policy, so that data with higher importance can be protected to a higher degree, and a calculation amount for protecting data with lower importance can be reduced. This can more effectively use calculation resources of the ECUs in the vehicle.

Usually, the security level of the to-be-sent data is in a positive correlation with a calculation amount corresponding to the protection policy. To be specific, a higher security level of the to-be-sent data indicates a larger calculation amount corresponding to the corresponding protection policy. In this way, data with a higher security level can be protected to a higher degree. This improves security of important data.

In a possible implementation, the encapsulated packet includes an identifier of the protection policy corresponding to the to-be-sent data, and the identifier of the protection policy is used by the second ECU to determine a manner of parsing the encapsulated packet.

Therefore, in this implementation of this disclosure, the second ECU can identify the corresponding protection policy based on the identifier of the protection policy carried in the encapsulated packet, so that the second ECU can quickly and accurately identify the protection policy of the encapsulated packet, and further determine an appropriate parsing manner.

In a possible implementation, each of the at least two protection policies includes one or more of the following policies: no protection, anti-replay attack protection, integrity protection, or confidentiality protection, where the no protection indicates that no protection is performed on the to-be-sent data, the anti-replay attack protection indicates that protection against a replay attack is performed on the to-be-sent data, the integrity protection indicates that integrity check code is generated for the to-be-sent data, where the integrity check code is used by the second ECU to check whether the encapsulated packet is complete, and the confidentiality protection indicates that encryption processing is performed on the to-be-sent data.

Therefore, in this implementation of this disclosure, the no protection, the anti-replay attack protection, the integrity protection, or the confidentiality protection is provided to protect the to-be-sent data. The different protection policies can have different calculation amounts. In this way, the protection policy that matches the to-be-sent data can be selected, to balance calculation resources of the ECUs in the vehicle, and improve effective utilization of the calculation resources.

In a possible implementation, if the protection policy corresponding to the to-be-sent data includes the anti-replay attack protection, the encapsulated packet carries an anti-replay counter. A value of the anti-replay counter changes each time the first ECU sends a packet frame to the second ECU. In this way, the second ECU discards the encapsulated packet when the value of the anti-replay counter is not within a preset range.

If the protection policy corresponding to the to-be-sent data includes the integrity protection, the encapsulated packet includes the integrity check code, where the integrity check code is used by the second ECU to check whether data obtained by parsing the encapsulated packet is complete.

If the protection policy corresponding to the to-be-sent data includes the confidentiality protection, a payload in the encapsulated packet includes ciphertext, where the ciphertext is obtained by encrypting the to-be-sent data by using a preset encryption algorithm.

Therefore, in this implementation, for different policies, the encapsulated packet can include corresponding data. This provides a format for encapsulating the packet.

In a possible implementation, the encapsulated packet is a Scalable service-Oriented MiddlewarE (SOME) over Internet Protocol (IP) (SOME/IP) packet. Usually, the SOME/IP packet is small-sized protection, and the ECU may quickly encapsulate the data to obtain the SOME/IP packet. This disclosure provides protection for the SOME/IP packet.

In a possible implementation, if the protection policy corresponding to the to-be-sent data includes the integrity protection or the confidentiality protection, before the first ECU encapsulates the to-be-sent data according to the protection policy corresponding to the to-be-sent data, the method further includes that the first ECU generates a derived key based on a preset pre-shared key (PSK), where the derived key is used to perform integrity protection or confidentiality protection on the to-be-sent data.

Therefore, in this implementation, the derived key can be generated based on the shared key. This completes integrity protection or confidentiality protection on the to-be-sent data, and improves security of the encapsulated packet.

According to a second aspect, this disclosure provides a data transmission method, applied to a vehicle. The vehicle includes a plurality of ECUs. A first ECU and a second ECU are any two ECUs of the plurality of ECUs. The plurality of ECUs is connected through Ethernet. The method includes that the second ECU receives an encapsulated packet sent by the first ECU. The second ECU obtains a protection policy corresponding to the encapsulated packet, where the protection policy corresponding to the encapsulated packet includes an encapsulation manner used by the first ECU to obtain the encapsulated packet. The second ECU parses the encapsulated packet according to the protection policy, to obtain a parsing result.

In this implementation, after receiving the encapsulated packet sent by the first ECU, the second ECU can determine the protection policy corresponding to the encapsulated packet, and parse the encapsulated packet according to the protection policy. The first ECU can select the protection policy corresponding to the encapsulated packet from a plurality of protection policies. Matched protection policies can be selected for different data, so that calculation amounts of data transmitted between ECUs in the vehicle are balanced, data with higher importance can be protected to a higher degree, and a calculation amount for protecting data with lower importance is reduced. This can more effectively use calculation resources of the ECUs in the vehicle.

In a possible implementation, the protection policy corresponding to the encapsulated packet includes one or more of the following policies: no protection, anti-replay attack protection, integrity protection, or confidentiality protection, where the no protection indicates that no protection is performed on to-be-sent data, the anti-replay attack protection indicates that protection against a replay attack is performed on the to-be-sent data, the integrity protection indicates that integrity check code is added in the encapsulated packet, where the integrity check code is used to check, when the encapsulated packet is parsed, whether data obtained through parsing is complete, and the confidentiality protection indicates that encryption processing is performed on to-be-sent data.

In this implementation, the no protection, the anti-replay attack protection, the integrity protection, or the confidentiality protection is provided to protect the to-be-sent data. The different protection policies can have different calculation amounts. In this way, the protection policy that matches the to-be-sent data can be selected, to balance calculation resources of the ECU in the vehicle, and improve effective utilization of the calculation resources.

In a possible implementation, if the protection policy corresponding to the encapsulated packet includes the anti-replay attack protection, a header of the encapsulated packet includes a value of an anti-replay counter. The method may further include, if determining that the value of the anti-replay counter included in the encapsulated packet is not within a preset range, the second ECU discards the encapsulated packet.

In this implementation, the anti-replay counter can be used to perform replay protection, and the second ECU can discard the encapsulated packet in which the value of the anti-replay counter is not within the preset range. This avoids a replay attack.

In a possible implementation, if the protection policy corresponding to the encapsulated packet includes the integrity protection, the encapsulated packet includes the integrity check code. After the second ECU parses the encapsulated packet according to the protection policy, the method further includes that the second ECU determines, with reference to the integrity check code, whether a parsing result is complete. If the parsing result is incomplete, the second ECU discards the parsing result.

In this implementation, after obtaining the parsing result of the encapsulated packet, the second ECU can verify whether the parsing result is complete. If the parsing result is incomplete, the second ECU discards the parsing result. This avoids using invalid data.

In a possible implementation, if the protection policy corresponding to the to-be-sent data includes the confidentiality protection, that the second ECU parses the encapsulated packet according to the protection policy may include that the second ECU decrypts, with reference to a preset decryption algorithm, a payload included in the encapsulated packet, to obtain the parsing result. In this implementation of this disclosure, if the first ECU encrypts the to-be-sent data, a payload included in the encapsulated packet is ciphertext, and the second ECU may decrypt the ciphertext by using a decryption algorithm. This improves security of the encapsulated packet.

In a possible implementation, the encapsulated packet includes an identifier of the protection policy corresponding to the to-be-sent data.

According to a third aspect, this disclosure provides a first ECU. The first ECU has a function of implementing the data transmission method in the first aspect. The function may be implemented by hardware, or may be implemented by hardware by executing corresponding software. The hardware or the software includes one or more modules corresponding to the function.

According to a fourth aspect, this disclosure provides a second ECU. The second ECU has a function of implementing the data transmission method in the second aspect. The function may be implemented by hardware, or may be implemented by hardware by executing corresponding software. The hardware or the software includes one or more modules corresponding to the function.

According to a fifth aspect, an embodiment of this disclosure provides an ECU, including a processor and a memory. The processor and the memory are interconnected through a line. The processor invokes program code in the memory to perform a processing-related function in the data transmission method according to any one of the first aspect or the second aspect.

According to a sixth aspect, an embodiment of this disclosure provides a data transmission apparatus. The data transmission apparatus may also be referred to as a digital processing chip or a chip. The chip includes a processing unit and a communications interface. The processing unit obtains program instructions through the communications interface. When the program instructions are executed by the processing unit, the processing unit is configured to perform a processing-related function in any one of the first aspect, the optional implementations of the first aspect, the second aspect, or the optional implementations of the second aspect.

According to a seventh aspect, an embodiment of this disclosure provides a vehicle. The vehicle includes at least one ECU, and the at least one ECU is configured to perform a step in any one of the first aspect, the optional implementations of the first aspect, the second aspect, or the optional implementations of the second aspect.

According to an eighth aspect, an embodiment of this disclosure provides a computer-readable storage medium, including instructions. When the instructions are run on a computer, the computer is enabled to perform the method in any one of the first aspect, the optional implementations of the first aspect, the second aspect, or the optional implementations of the second aspect.

According to a ninth aspect, an embodiment of this disclosure provides a computer program product including an instruction. When the computer program product runs on a computer, the computer is enabled to perform the method in any one of the first aspect, the optional implementations of the first aspect, the second aspect, or the optional implementations of the second aspect.

According to a tenth aspect, this disclosure provides a data transmission system, including at least one ECU. The at least one ECU is configured to perform the steps of the methods in any one of the first aspect, the optional implementations of the first aspect, the second aspect, or the optional implementations of the second aspect.

DESCRIPTION OF EMBODIMENTS

The following describes the technical solutions in embodiments of this disclosure with reference to the accompanying drawings in the embodiments. It is clear that the described embodiments are merely some but not all of the embodiments of this disclosure. All other embodiments obtained by a person skilled in the art based on the embodiments of this disclosure without creative efforts shall fall within the protection scope of this disclosure.

A data transmission method provided in the embodiments of this disclosure may be applied to various vehicle-related scenarios, for example, a scenario in which a driving path of a vehicle is planned, a scenario in which a status of a vehicle is monitored, or a scenario in which a vehicle is remotely controlled. In addition, this disclosure may also be applied to a scenario in which driving paths of various robots such as a freight robot, a detection robot, a sweeping robot, and another type of robot are planned, a scenario in which a status of a vehicle is monitored, a scenario in which a vehicle is remotely controlled, or the like. The freight robot is used as an example herein to further describe an application scenario. During transportation, the freight robot can monitor a status of the freight robot in real time, plan a transportation path of the freight robot, remotely control the freight robot, or the like to safely and stably complete transportation.

The following describes the embodiments of this disclosure with reference to accompanying drawings. A person of ordinary skill in the art may learn that the technical solutions provided in the embodiments of this disclosure are also applied to a similar technical problem as a technology evolves and a new scenario emerges.

Figure 1:
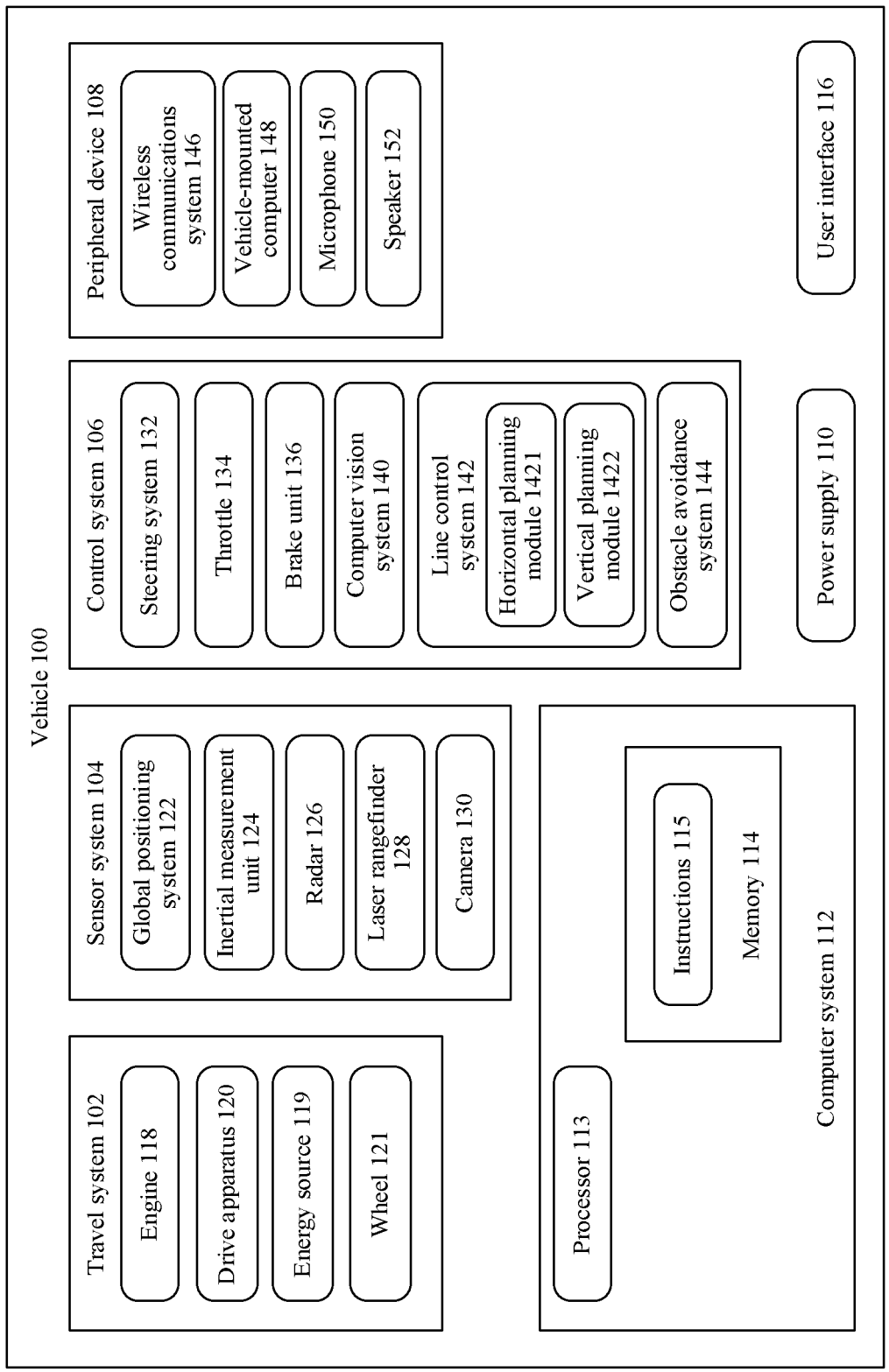
FIG. 1 is a schematic diagram of a structure of a vehicle according to an embodiment of this disclosure.

To facilitate understanding of this solution, in the embodiments of this disclosure, a structure of a vehicle provided in this disclosure is first described with reference to FIG. 1. FIG. 1 is a schematic diagram of a structure of a vehicle according to an embodiment of this disclosure. The vehicle 100 may be configured to be in an autonomous driving mode. For example, the vehicle 100 may control the vehicle 100 in the autonomous driving mode, determine current statuses of the vehicle and an ambient environment of the vehicle through a manual operation, determine whether there is an obstacle in the ambient environment, and control the vehicle 100 based on information about the obstacle. When the vehicle 100 is in the autonomous driving mode, the vehicle 100 may also be configured to operate without interacting with a person.

The vehicle 100 may include various subsystems, for example, a travel system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of components. In addition, the subsystems and components of the vehicle 100 may be connected to each other in a wired or wireless manner.

The travel system 102 may include a component that provides power for the vehicle 100 to move. In an embodiment, the travel system 102 may include an engine 118, an energy source 119, a drive apparatus 120, and a wheel/tire 121.

The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy. Examples of the energy source 119 include gasoline, diesel, other oil-based fuels, propane, other compressed gas-based fuels, ethanol, solar panels, batteries, and other power sources. The energy source 119 may also provide energy for another system of the vehicle 100. The drive apparatus 120 may transmit mechanical power from the engine 118 to the wheel 121. The drive apparatus 120 may include a gearbox, a differential, and a drive shaft. In an embodiment, the drive apparatus 120 may further include another component, for example, a clutch. The drive shaft may include one or more shafts that may be coupled to one or more wheels 121.

The sensor system 104 may include several sensors that sense information about an ambient environment of the vehicle 100. For example, the sensor system 104 may include a positioning system 122 (the positioning system may be a Global Positioning System (GPS), a BEIDOU system, or another positioning system), an inertial measurement unit (IMU) 124, a radar 126, a laser rangefinder 128, and a camera 130. The sensor system 104 may further include sensors (for example, an in-vehicle air quality monitor, a fuel gauge, and an oil temperature gauge) in an internal system of the monitored vehicle 100. One or more pieces of sensor data from these sensors may be used to detect objects and corresponding features (a location, a shape, a direction, a velocity, and the like) of the objects. Such detection and identification are key functions of a security operation of the autonomous vehicle 100. A sensor mentioned in the following implementations of this disclosure may be the radar 126, the laser rangefinder 128, the camera 130, or the like.

The positioning system 122 may be configured to estimate a geographical location of the vehicle 100. The IMU 124 is configured to sense a location and an orientation change of the vehicle 100 based on an inertial acceleration. In an embodiment, the IMU 124 may be a combination of an accelerometer and a gyroscope. The radar 126 may sense an object in the ambient environment of the vehicle 100 by using a radio signal, and may be represented as millimeter-wave radar or laser radar. In some embodiments, in addition to the object, the radar 126 may be further configured to sense a velocity and/or a moving direction of the object. The laser rangefinder 128 may sense, by using a laser, an object in an environment in which the vehicle 100 is located. In some embodiments, the laser rangefinder 128 may include one or more laser sources, a laser scanner, one or more detectors, and another system component. The camera 130 may be configured to capture a plurality of images of the ambient environment of the vehicle 100. The camera 130 may be a static camera or a video camera.

The control system 106 controls operations of the vehicle 100 and the components of the vehicle 100. The control system 106 may include various components, including a steering system 132, a throttle 134, a brake unit 136, a computer vision system 140, a line control system 142, and an obstacle avoidance system 144.

The steering system 132 may operate to adjust a moving direction of the vehicle 100. For example, in an embodiment, the steering system may be a steering wheel system. The throttle 134 is configured to control an operating velocity of the engine 118 and further control a velocity of the vehicle 100. The brake unit 136 is configured to control the vehicle 100 to decelerate. The brake unit 136 may use friction to reduce a rotational velocity of the wheel 121. In another embodiment, the brake unit 136 may convert kinetic energy of the wheel 121 into a current. The brake unit 136 may alternatively use another form to reduce a rotational speed of the wheel 121, to control the velocity of the vehicle 100. The computer vision system 140 may operate to process and analyze images captured by the camera 130 to identify objects and/or features in the ambient environment of the vehicle 100. The objects and/or the features may include a traffic signal, a road boundary, and an obstacle. The computer vision system 140 may use an object recognition algorithm, a structure from motion (SFM) algorithm, video tracking, and other computer vision technologies. In some embodiments, the computer vision system 140 may be configured to draw a map for an environment, track an object, estimate an object velocity, and the like. The line control system 142 is configured to determine a traveling route and a traveling velocity of the vehicle 100. In some embodiments, the line control system 142 may include a horizontal planning module 1421 and a vertical planning module 1422. The horizontal planning module 1421 and the vertical planning module 1422 are respectively configured to determine the traveling route and the traveling velocity of the vehicle 100 based on data from the obstacle avoidance system 144, the GPS 122 and one or more predetermined maps. The obstacle avoidance system 144 is configured to identify, evaluate, and avoid, or pass, in another manner, obstacles in the environment of the vehicle 100. The obstacles may be represented as an actual obstacle and a virtual moving object that may collide with the vehicle 100. In an instance, the control system 106 may add or include a component as replacement other than the components shown and described, or may delete some of the components shown above.

The vehicle 100 interacts with an external sensor, another vehicle, another computer system, or a user by using the peripheral device 108. The peripheral device 108 may include a wireless communications system 146, a vehicle-mounted computer 148, a microphone 150, and/or a speaker 152. In some embodiments, the peripheral device 108 provides a means for a user of the vehicle 100 to interact with the user interface 116. For example, the vehicle-mounted computer 148 may provide information for the user of the vehicle 100. The user interface 116 may further operate the vehicle-mounted computer 148 to receive an input of the user. The vehicle-mounted computer 148 may perform operations through a touchscreen. In another case, the peripheral device 108 may provide a means for the vehicle 100 to communicate with another device located in the vehicle. For example, the microphone 150 may receive audio (for example, a voice command or another audio input) from the user of the vehicle 100. Likewise, the speaker 152 may output audio to the user of the vehicle 100. The wireless communications system 146 may wirelessly communicate with one or more devices directly or through a communications network. For example, the wireless communications system 146 may perform communication through a third generation (3G) cellular network such as code-division multiple access (CDMA), Evolution-Data Optimized (EVDO), or Global System for Mobile Communications (GSM)/General Packet Radio Service (GPRS), perform communication through a fourth generation (4G) cellular network such as Long-Term Evolution (LTE), or perform communication through a fifth generation (5G) cellular network. The wireless communications system 146 may perform communication through a wireless local area network (WLAN). In some embodiments, the wireless communications system 146 may directly communicate with a device through an infrared link, BLUETOOTH, or ZIGBEE. Other wireless protocols, for example, various vehicle data transmission systems such as the wireless communications system 146, may include one or more dedicated short-range communications (DSRC) devices. These devices may include public and/or private data communication between vehicles and/or roadside stations.

The power supply 110 may supply power to various components of the vehicle 100. In an embodiment, the power supply 110 may be a rechargeable lithium-ion or lead-acid battery. One or more battery packs of such batteries may be configured as the power supply to supply power to the components of the vehicle 100. In some embodiments, the power supply 110 and the energy source 119 may be implemented together, for example, in some pure electric vehicles.

Some or all functions of the vehicle 100 are controlled by the computer system 112. The computer system 112 may include at least one processor 113. The processor 113 executes instructions 115 stored in a non-transitory computer-readable medium such as a memory 114. The computer system 112 may alternatively be a plurality of computing devices that control an individual component or a subsystem of the vehicle 100 in a distributed manner. The processor 113 may be any conventional processor, such as a commercially available central processing unit (CPU). Optionally, the processor 113 may be a dedicated device such as an application-specific integrated circuit (ASIC) or another hardware-based processor. Although FIG. 1 functionally illustrates the processor, the memory, and another component of the computer system 112 in a same block, a person of ordinary skill in the art should understand that the processor or the memory may actually include a plurality of processors or memories that are not stored in a same physical housing. For example, the memory 114 may be a hard disk drive or another storage medium located in a housing different from a housing of the computer system 112. Therefore, a reference to the processor 113 or the memory 114 is understood as a reference to a set of processors or memories that may or may not operate concurrently. Different from using a single processor to perform the steps described herein, some components such as a steering component and a deceleration component may include respective processors. The processor performs only computation related to a component-specific function.

In various aspects described herein, the processor 113 may be away from the vehicle 100 and wirelessly communicate with the vehicle 100. In other aspects, some of the processes described herein are performed on the processor 113 disposed inside the vehicle 100, while others are performed by a remote processor 113. The processes include necessary steps for performing a single operation.

In some embodiments, the memory 114 may include the instructions 115 (for example, program logics), and the instructions 115 may be executed by the processor 113 to perform various functions of the vehicle 100, including the functions described above. The memory 114 may also include additional instructions, including instructions used to send data to, receive data from, interact with, and/or control one or more of the travel system 102, the sensor system 104, the control system 106, and the peripheral device 108. In addition to the instructions 115, the memory 114 may further store data, such as a road map, route information, a location, a direction, a velocity, and other vehicle data of the vehicle, and other information. Such information may be used by the vehicle 100 and the computer system 112 when the vehicle 100 operates in an autonomous mode, a semi-autonomous mode, and/or a manual mode. The user interface 116 is configured to provide information for or receive information from the user of the vehicle 100. Optionally, the user interface 116 may include one or more input/output devices in a set of peripheral devices 108, for example, the wireless communications system 146, the vehicle-mounted computer 148, the microphone 150, or the speaker 152.

The computer system 112 may control functions of the vehicle 100 based on inputs received from various subsystems (for example, the travel system 102, the sensor system 104, and the control system 106) and from the user interface 116. For example, the computer system 112 may communicate with another system or component in the vehicle 100 through a can bus. For example, the computer system 112 may use an input from the control system 106 to control the steering system 132 to avoid an obstacle detected by the sensor system 104 and the obstacle avoidance system 144. In some embodiments, the computer system 112 may operate to provide control over many aspects of the vehicle 100 and the subsystems of the vehicle 100.

Optionally, one or more of the foregoing components may be installed separately from or associated with the vehicle 100. For example, the memory 114 may exist partially or completely separate from the vehicle 100. The foregoing components may be communicatively coupled together in a wired and/or wireless manner.

Optionally, the foregoing components are merely examples. In actual application, components in the foregoing modules may be added or deleted according to an actual requirement. FIG. 1 should not be understood as a limitation on the embodiments of this disclosure. The data transmission method provided in this disclosure may be performed by the computer system 112, the radar 126, the laser rangefinder 128, or the peripheral device such as the vehicle-mounted computer 148 or another vehicle-mounted terminal. For example, the data transmission method provided in this disclosure may be performed by the vehicle-mounted computer 148. The vehicle-mounted computer 148 may plan a driving path and a corresponding velocity curve for the vehicle, generate control instructions based on the driving path, and send the control instructions to the computer system 112. The computer system 112 controls the steering system 132, the throttle 134, the brake unit 136, the computer vision system 140, the line control system 142, the obstacle avoidance system 144, or the like in the control system 106 of the vehicle, to implement autonomous driving of the vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited in this embodiment of this disclosure.

The vehicle provided in this disclosure may include a plurality of ECUs. The data transmission method provided in this disclosure may be applied to data transmission between the ECUs in the vehicle, to improve data transmission efficiency, and enable a manner of encrypting a transmitted packet to match hardware performance of the ECUs.

Figure 2:
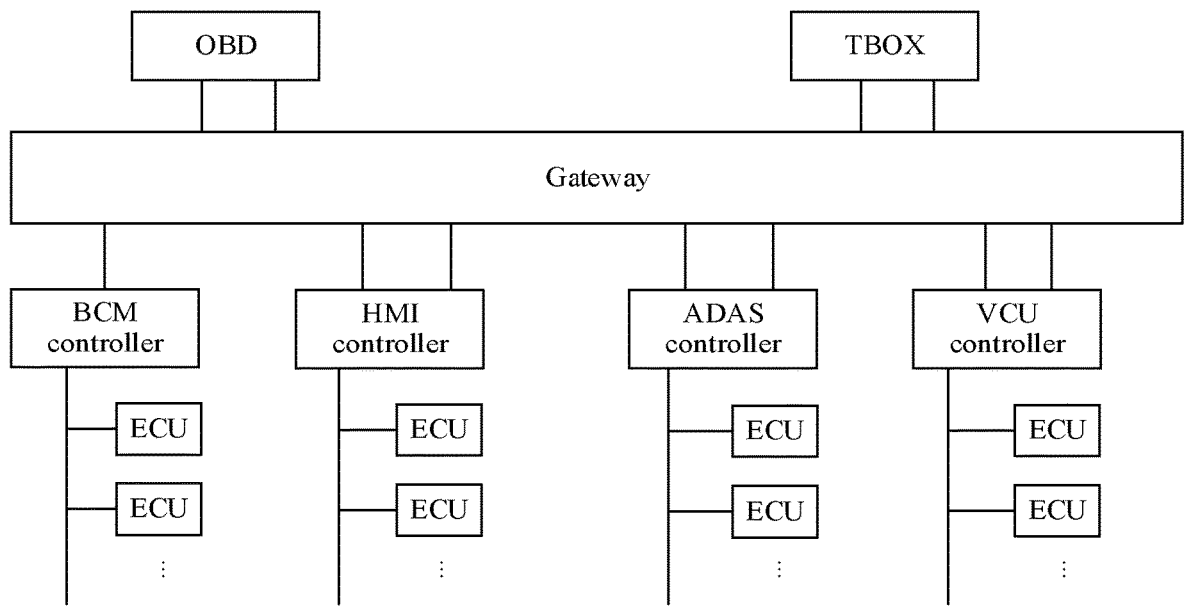
FIG. 2 is a schematic diagram of a structure of a data transmission system according to this disclosure.

For example, this disclosure further provides a vehicle, as shown in FIG. 2. The vehicle includes a plurality of ECUs, and each ECU may be connected to a corresponding controller, for example, a body control module (BCM) controller, a human machine interface (HMI) controller, an advanced driver assistance system (ADAS) controller, and a vehicle control unit (VCU). Controllers or a controller and an on-board diagnostics (OBD) or a telematics box (TBOX) are connected through a gateway. It may also be understood that one controller may manage or control one or more ECUs. The ECU may be an ECU in the systems described in FIG. 1. It may be understood that the vehicle may include a plurality of control modules, and each control module includes or is connected to one or more ECUs, such as the foregoing travel system 102, the sensor system 104, the steering system 132, the throttle 134, and the brake unit 136.

Each control module includes one or more ECUs configured to control an engine, a wheel, a steering system, a throttle, a brake, and the like of the vehicle.

Figure 3:
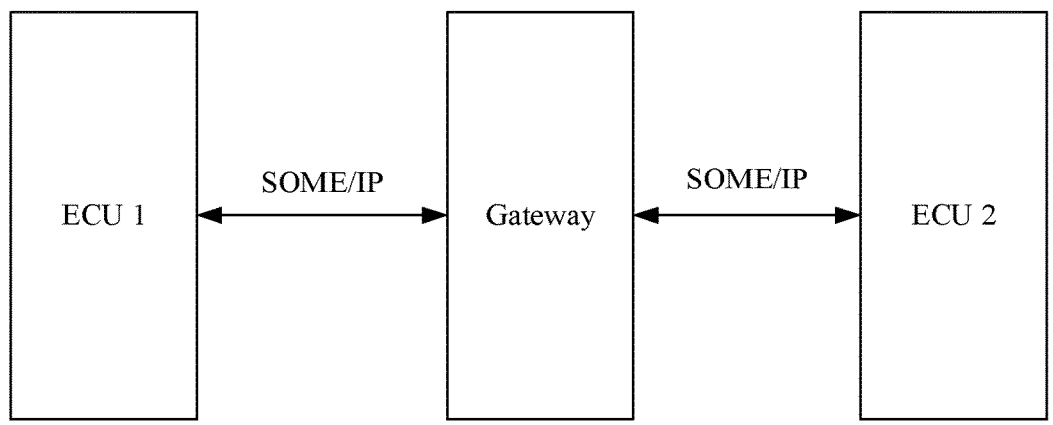
FIG. 3 shows a manner of data transmission between ECUs according to this disclosure.

As vehicle electrical systems such as in-vehicle infotainment, navigation, and assisted driving rapidly develop, data communicated through an in-vehicle network increases significantly. An IEEE 802.3 Ethernet technology with high throughput is introduced into the vehicle industry, and Ethernet gradually becomes a backbone network of the in-vehicle network in this year. Two ECUs are used as an example. For a process of data transmission between the two ECUs, refer to FIG. 3. An ECU 1 may communicate with an ECU 2 through a gateway. The ECU 1 may transmit the data with the ECU 2 through the gateway, and a format of the transmitted data may be a SOME/IP encapsulation format. This implements stable and secure data transmission.

The SOME/IP is a flexible service-oriented middleware based on an IP. A main application scenario of the SOME/IP may include a scenario such as remote procedure call (RPC), publish/subscribe, or service discovery. However, Ethernet carries heavy communication traffic. Hardware performance of a vehicle-mounted system cannot support if encryption protection is performed on all data. In this disclosure, protection including integrity protection, confidentiality protection, anti-replay attack protection, and the like is performed on the SOME/IP with light communication traffic and a higher security level, to strike a balance between performance of a device and security for transmitting data.

Figure 4A:
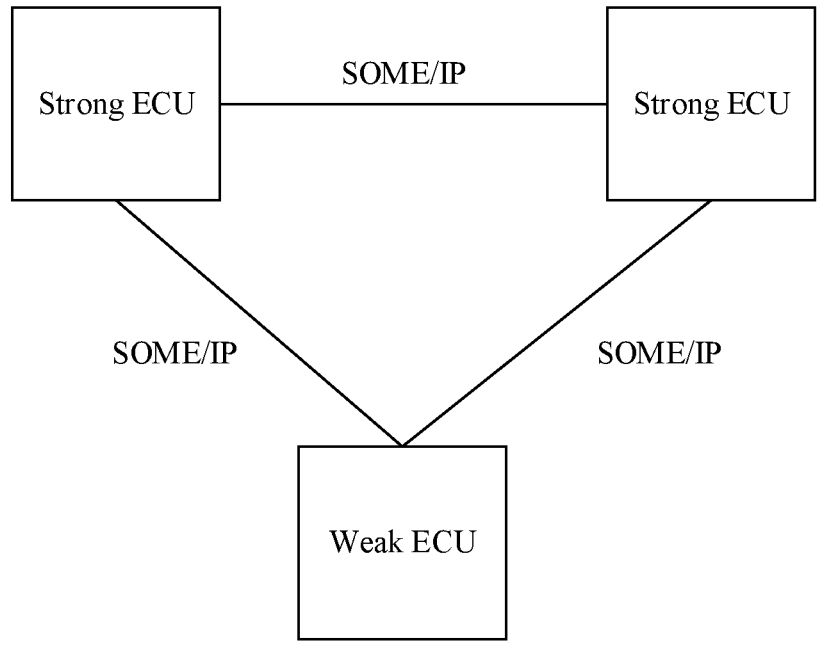
FIG. 4A shows another manner of data transmission between ECUs according to this disclosure.
Figure 4B:
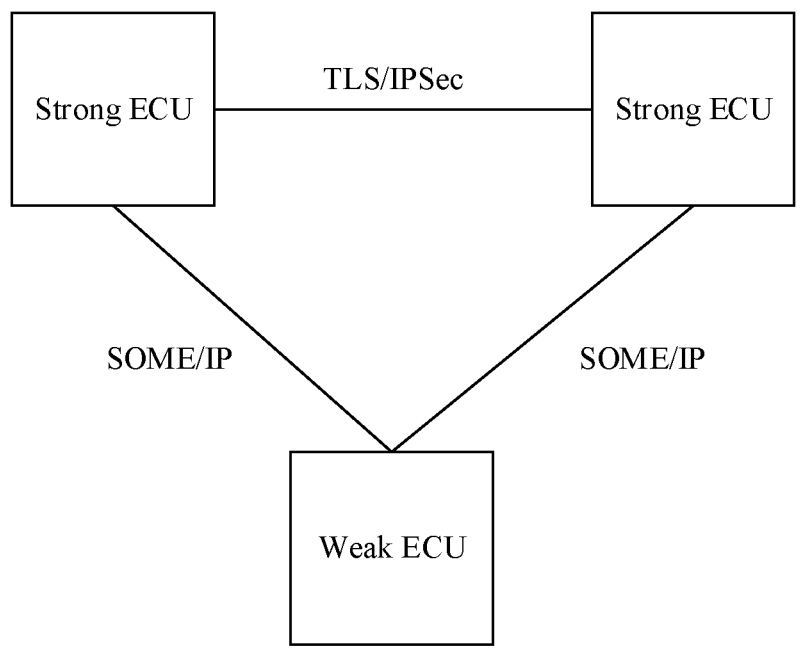
FIG. 4B shows another manner of data transmission between ECUs according to this disclosure.

In some scenarios, ECUs may be further classified into a strong ECU and a weak ECU based on computing capabilities of the ECUs, for example, based on computing speeds. A computing speed of the strong ECU is higher than a computing speed of the weak ECU. Usually, a large computing amount is required for processing data according to a TLS/IPSec protocol, while light communication traffic is required according to a SOME/IP protocol. As shown in FIG. 4A and FIG. 4B, strong ECUs may transmit data with each other according to a SOME/IP protocol or a Transport Layer Security (TLS)/IP Security (IPSec) protocol, and a strong ECU may transmit data with a weak ECU according to a SOME/IP protocol.

The following describes in detail the data transmission method provided in this disclosure. It should be noted that the data transmission method provided in this disclosure may be applied to a vehicle. The vehicle includes a plurality of ECUs. The following describes in detail the data transmission method provided in this disclosure by using any two ECUs, which are referred to as a first ECU and a second ECU in the following as an example.

Figure 5:
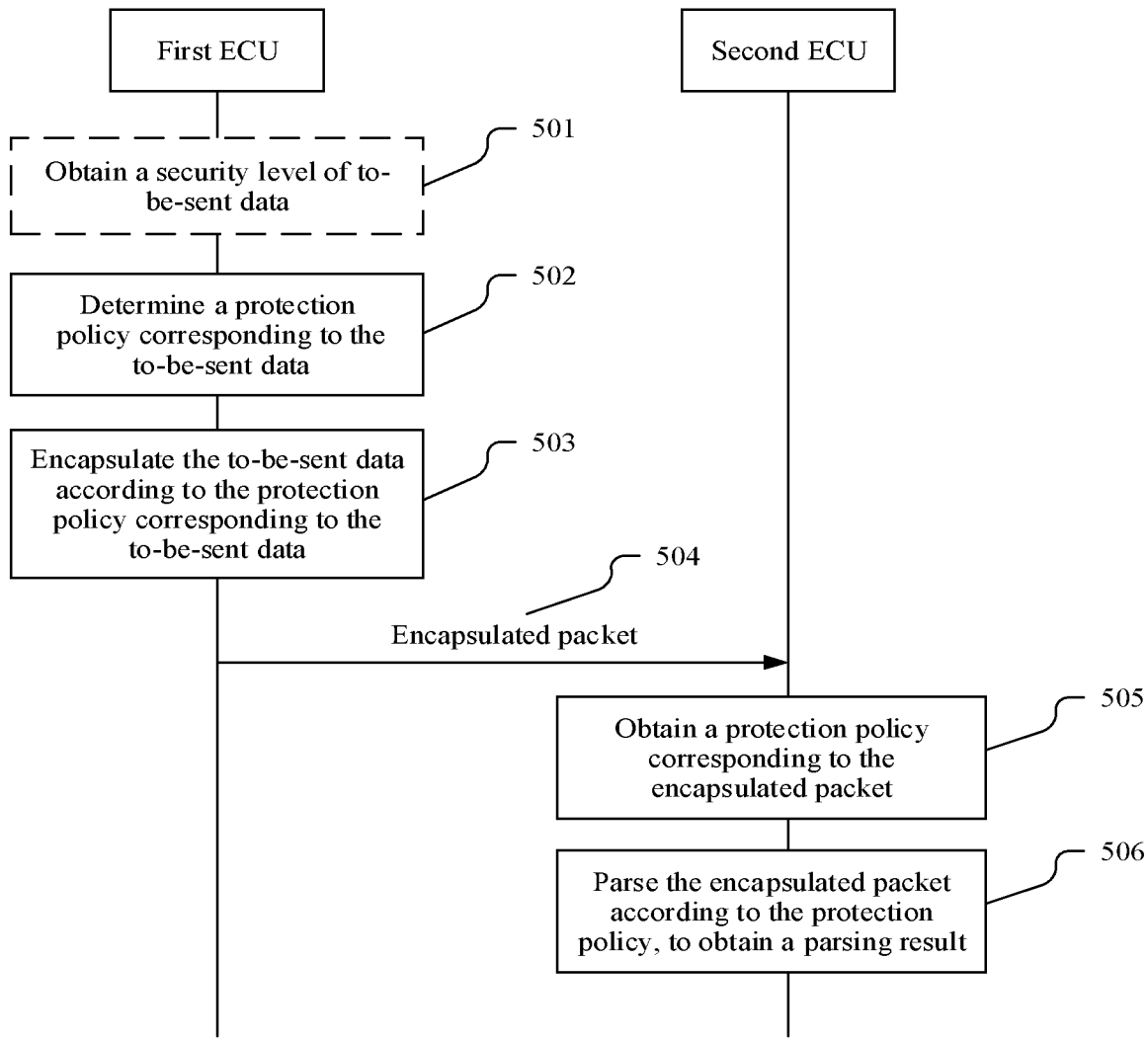
FIG. 5 is a schematic flowchart of a data transmission method according to this disclosure.

FIG. 5 is a schematic flowchart of a data transmission method according to this disclosure. Details are as follows.

501: A first ECU obtains a security level of to-be-sent data.

The security level is used to indicate importance of the to-be-sent data. The security level may include a plurality of predefined categories. Data with different importance may correspond to different protection policies.

Usually, a security level corresponding to each ECU may be preset, or a security level is set for each type of data, or the like. For example, if an ECU is configured to control a vehicle to travel, assist a vehicle to travel, or the like, a security level corresponding to the ECU is high. If an ECU is configured to control the media of a vehicle, such as music, a radio station, a video, or a recorded video, a security level corresponding to the ECU is low.

Optionally, a mapping relationship between an identifier carried in the data and a security level may be preset. The identifier may be an identifier of a type of the data, an identifier of an ECU that generates the data, or the like.

Optionally, the mapping relationship may be a relationship between the identifier of the ECU and the security level. A security level corresponding to each ECU in the vehicle is determined based on a type of the ECU in the vehicle. Usually, ECUs in the vehicle may be classified into a plurality of types, for example, may be classified into an ECU for controlling a throttle of the vehicle, an ECU for controlling a brake of the vehicle, an ECU for controlling steering of the vehicle, an ECU for controlling an engine of the vehicle, an ECU for controlling a sensor, an ECU in a vehicle-mounted terminal, and an ECU in a loudspeaker. It may be understood that, in the systems shown in FIG. 1, each component has one or more ECUs, and a security level may be set for each ECU based on importance of data transmitted by the ECU.

For example, as shown in Table 1, a corresponding security level may be set for each ECU, and mapping may be performed by using an identifier of each ECU and the security level.

TABLE 1

| Identifier of an ECU | Security level |
| --- | --- |
| 8859 (ECU in a throttle) | 5 |
| 8860 (ECU in a brake) | 5 |
| 8870 (ECU in a steering system) | 5 |
| 8896 (ECU in an engine) | 5 |
| 8898 (ECU in a speaker) | 1 |
| 8905 (ECU in a display) | 1 |
| ... | ... |

Usually, a higher security level indicates higher importance of data in an ECU. For example, an ECU in a throttle, a brake, a steering system, or an engine of a vehicle is configured to control acceleration, deceleration, or steering of the vehicle, and is closely related to driving security of the vehicle. An ECU with higher importance may subsequently correspond to a protection policy with a higher protection degree. This improves security of data transmitted by an important ECU, improves driving security of the vehicle, and improves user security.

It should be noted that step 501 in this disclosure is an optional step, that is, the security level of the to-be-sent data may not be obtained. This step may be adjusted based on an actual application scenario. This is not limited herein.

Optionally, the mapping relationship may be a relationship between the identifier of the type of the data and the security level. The type of the data may include control data of the vehicle or media data. The control data of the vehicle may be further classified into data for controlling the vehicle to travel or data for controlling an auxiliary component of the vehicle. The auxiliary component is, for example, a window, a power seat, or an air conditioner of the vehicle. A security level of the data for controlling the vehicle to travel is usually higher than a security level of the data for controlling the auxiliary component of the vehicle. The media data may include data such as audio, a video, or an image. Usually, a data volume of the media data is large. If protection is performed on the media data, large computing resources need to be consumed. In addition, importance of the media data is usually not higher than importance of the control data of the vehicle. Therefore, a lower security level may be set for the media data.

For example, a relationship between a type of data and a security level may be set in advance, as shown in Table 2.

TABLE 2

| Type of data | Security level |
| --- | --- |
| A (travel control instruction) | 5 |
| B (data from a sensor) | 4 |
| C (communicated data) | 3 |
| D (data for auxiliary control) | 2 |
| E (media data) | 1 |
| ... | ... |

The type A of the data indicates the instruction for controlling a vehicle to travel, for example, data transmitted between a plurality of ECUs in a steering system of the vehicle, or an instruction or data transmitted by an ECU in a throttle, an ECU in a brake unit, an ECU in an engine, or an ECU in a drive apparatus for controlling an operation such as steering, acceleration, or deceleration of the vehicle. The type A corresponds to the security level 5. The highest security level corresponds to the highest importance. The type B of the data may include the data collected by the sensor, such as an IMU, a radar, or a laser rangefinder in the vehicle. The type B corresponds to the security level 4. The type C of the data indicates the data communicated between the vehicle and another device, for example, the vehicle establishes a connection to a mobile phone of a user or establishes a connection to a BLUETOOTH headset of a user by using a BLUETOOTH car kit. The type C corresponds to the security level 3. The type D of the data indicates the data for controlling a device in the vehicle, for example, control data for adjusting a rearview mirror, a wiper, or a seat of the vehicle. The type D corresponds to the security level 2. The type E of the data includes the media data such as video or audio data transmitted in the vehicle, for example, data of an FM radio in the vehicle or a video played on a display. The type E corresponds to the security level 1, namely, the lowest security level.

Therefore, in this implementation of this disclosure, the security level may be set based on the type of the data. An instruction or data for controlling an operation such as steering, acceleration, or deceleration of the vehicle affects the driving security of the vehicle, and therefore, importance of the data is high, and the protection policy with the higher protection degree may be subsequently set for the data. This improves the driving security of the vehicle.

502: The first ECU determines a protection policy corresponding to the to-be-sent data.

After obtaining the to-be-sent data, the first ECU determines, from a plurality of protection policies, the protection policy that matches the to-be-sent data.

The protection policy may be understood as a manner of whether to perform encapsulation on the data, for example, whether to perform encryption or whether to add check code. The plurality of protection policies includes a plurality of different manners for encapsulating the to-be-sent data. For example, the plurality of protection policies may be preset, for example, no protection, encryption performed on the to-be-sent data, check added in the to-be-sent data, or both encryption performed on and check added in the to-be-sent data.

At least two of the plurality of protection policies have different calculation amounts for processing the to-be-sent data. For example, if a quantity of policies included in a first protection policy covers and is greater than a quantity of policies included in a second protection policy, a calculation amount required when the first protection policy is used to protect the data is greater than a calculation amount required when the second protection policy is used to protect the data.

For example, each protection policy may include but is not limited to one or more of the following policies: no protection, anti-replay attack protection, integrity protection, confidentiality protection, or the like.

The no protection indicates that no protection is performed on the to-be-sent data, for example, no encryption is performed or no check code is added. In this case, security for transmitting the to-be-sent data is poor.

The anti-replay attack protection indicates that protection against replay attack is performed on the to-be-sent data, for example, another device is prevented from obtaining data transmitted between ECUs by using historical data. It may be understood that the replay attack is also referred to as a playback attack or a repeat attack, and indicates that an attacker sends, to a receiving device, a packet that has been received by the receiving device, to spoof the receiving device and steal data. This implementation of this disclosure can improve security of the data between the ECUs through the anti-replay attack protection.

The integrity protection indicates that integrity check code is added in an encapsulated packet. The integrity check code is used to check, when the encapsulated packet is parsed, whether data obtained through parsing is complete, to avoid that received data is incomplete or some content is received incorrectly. For example, the to-be-sent data may be calculated by using a preset check algorithm to obtain the integrity check code, and the integrity check code is added in the packet. After receiving the packet, a receiving device may check a payload in the packet by using the preset algorithm and the integrity check code, to determine whether data in the payload is complete.

The confidentiality protection indicates that encryption processing is performed on the to-be-sent data, to prevent another device from obtaining, through parsing, content included in the to-be-sent data when stealing the to-be-sent data. For example, a preset key may be used to obtain a derived key. Then, all or a part of data in the to-be-sent data is encrypted by using the derived key to obtain encrypted ciphertext, and the ciphertext is encapsulated into a payload of a packet. Therefore, even if receiving the packet, another device cannot obtain, through parsing, content included in the packet. This improves security of the packet.

If the protection policy is not used to protect the data, a calculation amount corresponding to the protection policy is usually very small. More measurements included in the protection policy usually indicate more calculation amounts required when the protection policy is used to protect the data.

For ease of understanding, descriptions are provided by using an example of a protection policy including several policies, as shown in Table 3.

TABLE 3

| Protection policy | Anti-replay attack protection | Integrity protection | Confidentiality protection |
| --- | --- | --- | --- |
| 1 | | | |
| 6 | ✓ | ✓ | |
| 7 | ✓ | ✓ | ✓ |
| ... | ... | ... | ... |

The identifier 1 indicates a protection policy 1, the identifier 6 indicates a protection policy 6, and the others are similar. The protection policy 1 is no protection, the protection policy 6 includes the anti-replay attack protection and the integrity protection, and a protection policy 7 includes the anti-replay attack protection, the integrity protection, and the confidentiality protection. A calculation amount required by the protection policy 7 to protect data is greater than a calculation amount required by the protection policy 1 to protect the data and a calculation amount required by the protection policy 6 to protect the data.

It should be noted that, in the example in Table 3, calculation amounts required by different protection policies to protect the data may be the same or different, and further, need to be determined based on an actual application scenario. This disclosure is merely an example for description.

In this disclosure, the protection policy that matches the to-be-sent data may be selected from the plurality of protection policies in a plurality of manners. The protection policy may be determined based on the security level mentioned in step 501, or the protection policy may be directly determined based on content included in the to-be-sent data, or the like. The following separately describes specific manners of determining the protection policy corresponding to the to-be-sent data by using the two manners as examples.

Manner 1: The protection policy is determined directly based on the content included in the to-be-sent data.

In Manner 1, the security level of the to-be-sent data may not be learned of, that is, step 501 may not be performed.

Further, an appropriate protection policy is selected from the plurality of preset protection policies based on the content included in the to-be-sent data, for example, the identifier of the ECU that generates the to-be-sent data, the identifier of the to-be-sent data, or a data amount of the to-be-sent data.

In this manner, a protection policy corresponding to each ECU or a protection policy corresponding to each type of data may be set in advance. For example, a mapping table may be generated in advance. The mapping table may include an identifier of each ECU and an identifier of a corresponding protection policy, or the mapping table may include a type of data and an identifier of a protection policy. For example, a protection policy with a higher protection degree may be set for an ECU that controls a vehicle to travel.

For example, with reference to the identifier of the protection policy in Table 3, a mapping table that includes an identifier of each ECU and an identifier of a corresponding protection policy may be shown in Table 4. Certainly, the following ECUs are merely examples of some ECUs. Further, an identifier of an ECU and a corresponding protection policy may be adjusted based on an actual application scenario. This is not limited in this disclosure.

TABLE 4

| Identifier of an ECU | Protection policy |
| --- | --- |
| 8859 (ECU in a throttle) | 7 |
| 8860 (ECU in a brake) | 7 |
| 8870 (ECU in a steering system) | 7 |
| 8896 (ECU in an engine) | 7 |
| 8898 (ECU in a speaker) | 1 |
| 8905 (ECU in a display) | 1 |
| ... | ... |

The ECUs whose identifiers are 8859, 8860, 8870, and 8896 correspond to the protection policy 7. The protection policy 7 includes anti-replay attack protection, integrity protection, and confidentiality protection. The ECU whose identifier is 8898 and the ECU whose identifier is 8905 correspond to the protection policy 1, namely, no protection. Usually, a more secure protection policy may be selected for data that is transmitted by an ECU in a vehicle for controlling the vehicle to travel and that is with higher importance, so as to ensure transmission of important data and improve driving security of the vehicle. Compared with the data transmitted by the ECU for controlling the vehicle to travel, the media data transmitted by the ECU corresponding to in-vehicle entertainment has lower importance. A protection policy with a small calculation amount may be selected, to reduce a calculation amount for encapsulating the data transmitted by the ECU corresponding to the in-vehicle entertainment. This improves operation efficiency of the ECU in the vehicle, and improves the driving security of the vehicle.

Therefore, if the relationship between the identifier of the ECU and the protection policy is set in advance, if the to-be-sent data is generated by the first ECU, the first ECU may select the matched protection policy, or if the to-be-sent data includes the identifier of the ECU that generates the to-be-sent data, the first ECU may select, based on the identifier, the protection policy that matches the identifier of the ECU that generates the to-be-sent data.

For another example, with reference to the identifier of the protection policy in Table 3, a mapping table that includes an identifier of a protection policy corresponding to a type of data may be shown in Table 5. Certainly, the following merely lists examples of several types of data. Further, a specific type of data and a corresponding protection policy may be adjusted based on an actual application scenario. This is not limited in this disclosure.

TABLE 5

| Type of data | Protection policy |
| --- | --- |
| A (travel control instruction) | 7 |
| B (data from a sensor) | 6 |
| C (communicated data) | 6 |
| D (data for auxiliary control) | 6 |
| E (media data) | 1 |
| . . . | . . . |

The type A of the data indicates the instruction for controlling a vehicle to travel, for example, data transmitted between a plurality of ECUs in a steering system of the vehicle, or an instruction or data transmitted by an ECU in a throttle, an ECU in a brake unit, an ECU in an engine, or an ECU in a drive apparatus for controlling an operation such as steering, acceleration, or deceleration of the vehicle. The type A corresponds to the protection policy 7. The protection policy 7 includes anti-replay attack protection, integrity protection, and confidentiality protection. The type B of the data may include the data collected by the sensor, such as an IMU, a radar, or a laser rangefinder in the vehicle. The type B corresponds to the protection policy 6. The protection policy 6 includes integrity protection and confidentiality protection. The type C of the data indicates the data communicated between the vehicle and another device, for example, the vehicle establishes a connection to a mobile phone of a user or establishes a connection to a BLUETOOTH headset of a user by using a BLUETOOTH car kit. The type C corresponds to the protection policy 6, namely, integrity protection and confidentiality protection. The type D of the data indicates the data for controlling a device in the vehicle, for example, control data for adjusting a rearview mirror, a wiper, or a seat of the vehicle. The type E of the data includes the video or audio data transmitted in the vehicle, for example, data of an FM radio in the vehicle or a video played on a display. The type E corresponds to the protection policy 1, namely, no protection. Therefore, the data related to vehicle traveling, such as the data for controlling the vehicle to travel, is with the higher protection degree, and the corresponding protection policy usually includes the larger calculation amount. However, a large data amount and a large bandwidth are occupied for the media data corresponding to the entertainment, such as the audio or video data, and more calculation resources are consumed if protection is performed. Therefore, the calculation amount for the media data is reduced in a no protection manner. This improves efficiency of calculating other data by the vehicle.

Therefore, if the to-be-sent data includes the type of the data, the matched protection policy can be selected based on the type of the data included in the to-be-sent data.

In Manner 1, the matched protection policy can be selected based on the type of the data or the ECU that generates the data, so that the protection policy with the higher protection degree can be selected for the data with the higher importance, and a protection policy with the lower protection degree can be selected for the data with the lower importance. In this way, the data with the higher importance can be protected with a sufficient calculation amount, to improve data security, and the calculation amount occupied by the data with the lower importance can be reduced. This evenly allocates calculation amounts of the ECUs in the vehicle, improves calculation efficiency of the vehicle, and further improves the driving security of the vehicle.

Manner 2: The matched protection policy is selected based on the security level.

In Manner 2, the protection policy that matches the security level may be selected from the plurality of protection policies based on the security level of the to-be-sent data determined in step 501. A higher security level of the to-be-sent data usually indicates a higher protection degree of the selected protection policy, and a larger calculation amount for calculation performed on the to-be-sent data.

For example, a mapping relationship between a security level and a protection policy may be set in advance. After the security level of the to-be-sent data is determined, the protection policy that matches the security level of the to-be-sent data may be selected from the plurality of protection policies based on the mapping relationship.

For example, a mapping relationship between a security level and a protection policy may be shown in Table 6. Certainly, this is merely an example for description, and specific content of the mapping relationship between the security level and the protection policy may be adjusted based on an actual application scenario. This is not limited herein.

TABLE 6

| Security level | Protection policy |
| --- | --- |
| 5 | 7 |
| 4 | 6 |
| 3 | 1 |
| . . . | . . . |

For the security level, refer to the descriptions in step 501. For the protection policy, refer to the related descriptions in Table 3. Details are not described herein again.

In this manner, the protection policy that matches the security level of the to-be-sent data may be selected for subsequent encapsulation. Therefore, the data with the higher security level can correspond to the protection policy with the higher protection degree, so as to improve security for transmitting data, and improve the driving security of the vehicle. The protection policy with the lower protection degree can be selected for the data with the lower security level, so as to reduce a calculation amount for protecting the data, and effectively improve utilization of calculation resources of the ECUs in the vehicle.

503: The first ECU encapsulates the to-be-sent data according to the protection policy corresponding to the to-be-sent data.

After the matched protection policy is selected from the plurality of protection policies for the to-be-sent data, the to-be-sent data may be encapsulated according to the selected protection policy, to obtain an encapsulated packet.

Further, if the protection policy corresponding to the to-be-sent data is no protection, a header may be directly added in the to-be-sent data, to obtain the encapsulated packet.

If the protection policy corresponding to the to-be-sent data includes one or more policies, the to-be-sent data may be encapsulated according to the plurality of policies, to obtain the encapsulated packet.

Several policies such as anti-replay attack protection, integrity protection, or confidentiality protection are used as examples to describe a process for encapsulating the to-be-sent data.

The anti-replay attack protection: The first ECU and the second ECU may set an anti-replay counter for the transmitted data. The anti-replay counter may be set by the first ECU, or may be set by the second ECU. Each time the first ECU sends a frame of data to the second ECU, a value of the counter increases by 1. Therefore, when receiving the encapsulated packet, the second ECU continues to parse the packet only when the value of the counter included in the encapsulated packet is greater than a value of a counter locally stored in the second ECU. Otherwise, the second ECU discards the packet. In addition, after parsing the encapsulated packet, the second ECU updates the value of the local counter to the value of the counter included in the encapsulated packet. Therefore, in the anti-replay attack protection, the counter may be used to prevent another device from performing the replay attack on the first ECU and the second ECU, so as to avoid stealing the data.

The integrity protection: The first ECU may use a preset algorithm, for example, an integrity check algorithm such as a message-digest (MD) algorithm, a secure hash algorithm (SHA), a message authentication code (MAC) algorithm, hash-based MAC (HMAC), a block cipher (for example, counter with cipher block chaining (CBC)-MAC (CCM)) algorithm, a cipher-based MAC (CMAC) algorithm, or an advanced encryption standard (AES)-Galois MAC mode (GMAC)-128 algorithm, and use the to-be-sent data as an input, to output the integrity check code for the to-be-sent data and include the integrity check code in the encapsulated packet. In this way, when receiving the encapsulated packet, the second ECU may verify, based on the integrity check code, whether a payload in the encapsulated packet is complete.

The confidentiality protection: The to-be-sent data is encrypted by using a preset encryption algorithm to obtain corresponding ciphertext, where the ciphertext is a payload included in the encapsulated packet. For example, a PSK may be preset, a derived key is generated each time the data is transmitted, and then the derived key and an encryption algorithm such as a symmetric algorithm (for example, data encryption standard (DES)), an international data encryption algorithm (IDEA), a block cipher (for example, CCM) algorithm, an AES algorithm, or an AES-GMAC-128 algorithm are used to output ciphertext corresponding to the to-be-sent data, and add the ciphertext to the encapsulated packet. After receiving the encapsulated packet, the second ECU may decrypt the ciphertext in the encapsulated packet by using a corresponding decryption algorithm, to obtain plaintext corresponding to the ciphertext, namely, the to-be-sent data.

Therefore, in this implementation of this disclosure, matched protection policies can be selected for different data, so that calculation amounts of the data transmitted between the ECUs in the vehicle are balanced, the data with the higher importance can be protected to the higher degree, and the calculation amount for protecting the data with the lower importance is reduced. This can more effectively use calculation resources of the ECUs in the vehicle.

Figure 6:
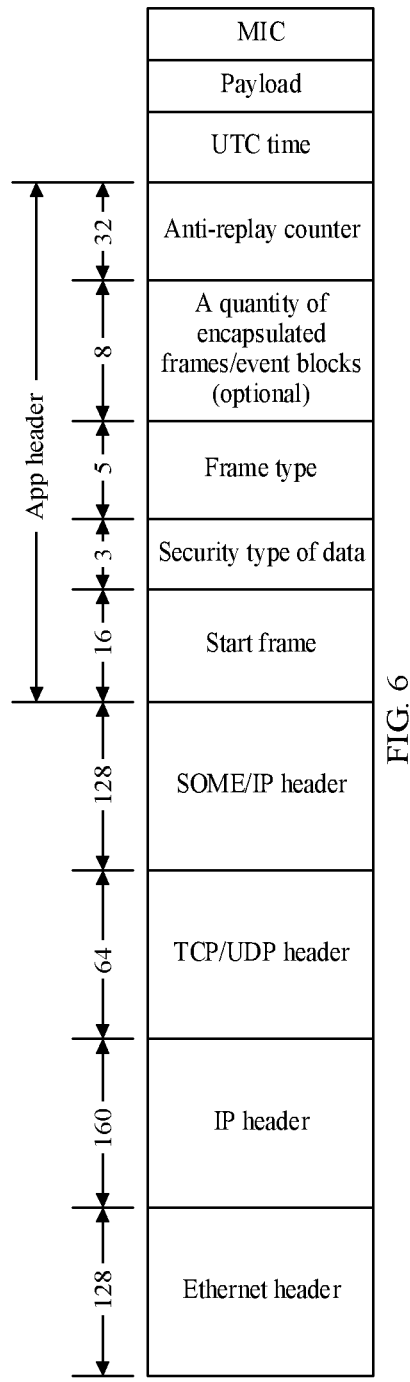
FIG. 6 is a schematic diagram of a format of an encapsulated packet according to this disclosure.

For example, for an encapsulated packet, refer to FIG. 6. The encapsulated packet may include an Ethernet header, an IP header, a Transmission Control Protocol (TCP)/User Datagram Protocol (UDP) header, a SOME/IP header, a start frame, a security type of data (denoted as SecTag), a frame type, a quantity of encapsulated frames/event blocks (optional), an anti-replay counter, coordinated universal time (UTC), a payload, and check code (for example, message integrity check (MIC)) used for integrity check.

Usually, the Ethernet header, the IP header, the TCP/UDP header, the SOME/IP header, and the like are headers, and may include information such as a source address, a destination address, and a port number of corresponding protocols.

The start frame is usually a fixed value.

SecTag is a type of the protection policy in this disclosure. For example, the protection policy may be classified into a plurality of types: 0 indicates no check, no encryption, and no anti-replay; 1 indicates check, no encryption, and anti-replay; and 2 indicates check, encryption, and anti-replay.

A value of the anti-replay counter packet number (PN) increases by 1 each time an Ethernet packet is sent, to prevent a replay attack.

The quantity of encapsulated frames/event blocks (optional) indicates a quantity of data frames encapsulated in the packet.

The payload includes data that needs to be sent to a second ECU.

The MIC is check code used for the integrity check.

The process for encapsulating the to-be-sent data may include, after the Ethernet header, the IP header, the TCP/UDP header, and the SOME/IP header are set, SecTag, namely, the identifier of the protection policy that matches the to-be-sent data is set.

If SecTag=1 or 2, the value of the PN is set, and a value of a local PN of the first ECU increases by 1.

If SecTag=1 or 2, a CMAC algorithm, a block cipher (CCM) algorithm, an qHMAC, or an AES-GMAC-128 algorithm is used to generate the integrity check code for the to-be-sent data, namely, the MIC.

If SecTag=2, a block cipher (CCM) algorithm, an AES algorithm, or an AES-GMAC-128 algorithm may be used to convert all or a part of the to-be-sent data into ciphertext, and fill the ciphertext in the payload.

An AES-GCM-128 algorithm may be used to output integrity check code and ciphertext, and the AES-GCM-128 algorithm may be expressed as (C, T)=AES-GCM-128(K, IV, A, P).

K is a preset key or a derived key, and the derived key is obtained by deriving a set key.

IV is a 32-bit anti-replay counter.

A indicates that if encryption is not performed, A is a payload, or if encryption is performed, A is data between a first bit in a SOME/IP header and the UTC.

P indicates that if encryption is not performed, P is empty, or if encryption is performed, data between the UTC and the MIC can be fetched, namely, a payload segment.

C is ciphertext, namely, a payload part in the encapsulated packet.

T is 128-bit MAC. Any 32 bits in the 128-bit MAC, for example, the most significant 32 bits or the least significant 32 bits, are fetched as the MIC.

In addition, if a hardware device of the vehicle supports an AES algorithm, when the AES-GCM-128 algorithm is used for encryption or is used to add the integrity check code, hardware may be invoked for acceleration. This improves calculation efficiency.

In addition, because a calculation speed of the AES algorithm is high, an ECU with a weak calculation capability may also process the packet without a delay. This increases a calculation speed for the packet in the vehicle, and improves data transmission efficiency in the vehicle. In this way, the data in the vehicle can be quickly transmitted. Therefore, the driving security of the vehicle is improved.

504: The first ECU sends the encapsulated packet to the second ECU.

After the first ECU encapsulates the to-be-sent data according to the matched protection policy, and obtains the encapsulated packet, the first ECU may send the encapsulated packet to the second ECU through a wired network.

505: The second ECU obtains a protection policy corresponding to the encapsulated packet.

After receiving the encapsulated packet, the second ECU determines the protection policy corresponding to the encapsulated packet, and determines, according to the protection policy, how to parse the encapsulated packet.

Further, the encapsulated packet may carry an identifier of the protection policy, for example, the security type of the data in FIG. 6. Therefore, the second ECU can directly read the identifier of the protection policy from an App header of the encapsulated packet, and determine the corresponding protection policy based on the identifier.

For example, the protection policy may include but is not limited to one or more of the following policies: no protection, anti-replay attack protection, integrity protection, confidentiality protection, or the like. For specific content in each policy, refer to related descriptions in step 502. Details are not described herein again.

In a possible implementation, the encapsulated packet may carry the identifier of the ECU that generates the data included in the encapsulated packet or the identifier of the type of the data included in the encapsulated packet. The second ECU may determine the corresponding protection policy based on the identifier of the ECU that generates the data included in the encapsulated packet or the identifier of the type of the data included in the encapsulated packet. A specific determining manner is similar to the related descriptions in step 502. Details are not described herein again.

506: The second ECU parses the encapsulated packet according to the protection policy, to obtain a parsing result.

If the protection policy corresponding to the encapsulated packet is no protection, the second ECU may directly read the payload in the encapsulated packet to obtain the parsing result.

If the protection policy corresponding to the encapsulated packet includes anti-replay attack protection, the header of the encapsulated packet includes the value of the anti-replay counter. The second ECU may read the value of the anti-replay counter, and compare the value with the value of the local anti-replay counter. If the value of the anti-replay counter in the encapsulated packet is not greater than the value of the local anti-replay counter, the second ECU discards the encapsulated packet, otherwise, the second ECU continues to parse the encapsulated packet.

If the protection policy corresponding to the encapsulated packet includes integrity protection, the encapsulated packet includes the integrity check code. The second ECU may check the payload in the encapsulated packet based on the integrity check code. If the check succeeds and encryption is not performed, the second ECU may directly read the payload in the encapsulated packet to obtain the parsing result. If the check succeeds and encryption is performed, the second ECU may continue to decrypt the payload in the encapsulated packet.

If the protection policy corresponding to the encapsulated packet includes decryption, the second ECU decrypts the payload in the encapsulated packet by using a preset algorithm to obtain the plaintext, namely, the parsing result.

It should be noted that the integrity check and the decryption may be performed on the encapsulated packet simultaneously, or may be performed separately. If the integrity check and the decryption are performed separately, the decryption may be performed first, or the integrity check may be performed first. An execution sequence is related to a sequence in which the encryption and the integrity check are performed during encapsulation performed by the first ECU, and may be determined based on an actual application scenario. This is not limited in this disclosure.

For example, continue to refer to FIG. 6. A structure of the encapsulated packet shown in FIG. 6 is used as an example for description.

If SecTag=0, the encapsulated packet is not checked or decrypted. In addition, when SecTag=0, bits of the anti-replay counter, the MIC, and the like that are related to the protection policy and that are carried in the encapsulated packet may be reused as other data, to improve resource utilization.

If SecTag=1 or 2, the value of the PN is read. If the value is less than the value of the local PN, the packet is discarded. If the value is not less than the value of the local PN, next step of parsing is continued.

If SecTag=1, the payload is checked by using the integrity check code included in the encapsulated packet. If the check succeeds, the payload is read to obtain the parsing result.

If SecTag=2, in addition to the integrity check, decryption is performed on the payload to obtain the plaintext, namely, the parsing result.

An AES-GCM-128 algorithm is used as an example. The AES-GCM-128 algorithm may be used to perform only the integrity check, or the AES-GCM-128 algorithm may be used to perform both the integrity check and the decryption. The AES-GCM-128 algorithm may be expressed as:

$$P \text{ or Fail} = \text{AES-GCM-128}(K, IV, C, A, T).$$

K is a preset key or a derived key, and the derived key is obtained by deriving a set key.

IV is a 32-bit anti-replay counter.

A indicates that if encryption is not performed, A is a payload, or if encryption is performed, A is data between a first bit in a SOME/IP header and the UTC.

T is 128-bit MAC. Any 32 bits in the 128-bit MAC, for example, the most significant 32 bits or the least significant 32 bits, are fetched as the MIC.

When the check and the decryption succeed, plaintext P is output. When the check and the parsing fail, Fail is returned, which indicates that the parsing fails or the check fails.

Therefore, in this implementation of this disclosure, the first ECU can select, from the plurality of protection policies, the protection policy that matches the to-be-sent data, and can select an appropriate protection policy based on importance of the to-be-sent data. The plurality of protection policies can include protection policies with different calculation amounts. When importance of the to-be-sent data is higher, a calculation amount corresponding to the selected protection policy is usually higher. When importance of the to-be-sent data is lower, a calculation amount corresponding to the selected protection policy is usually lower. In this way, the data with the higher importance can be protected to the higher degree, and the calculation amount for protecting the data with the lower importance is reduced. This can more effectively use calculation resources of the ECUs in the vehicle. Correspondingly, the second ECU consumes the higher calculation amount for parsing the encapsulated packet with the higher importance, and the second ECU consumes the lower calculation amount for parsing the encapsulated packet with the lower importance, so that calculation resources of the ECUs in the vehicle can be balanced. This improves efficient utilization of the calculation resources, and ensures securely, stably, and efficiently transmission of the important packet.

The foregoing describes in detail a procedure of the data transmission method provided in this disclosure. The following describes in detail an apparatus provided in this disclosure based on the foregoing method.

Figure 7:
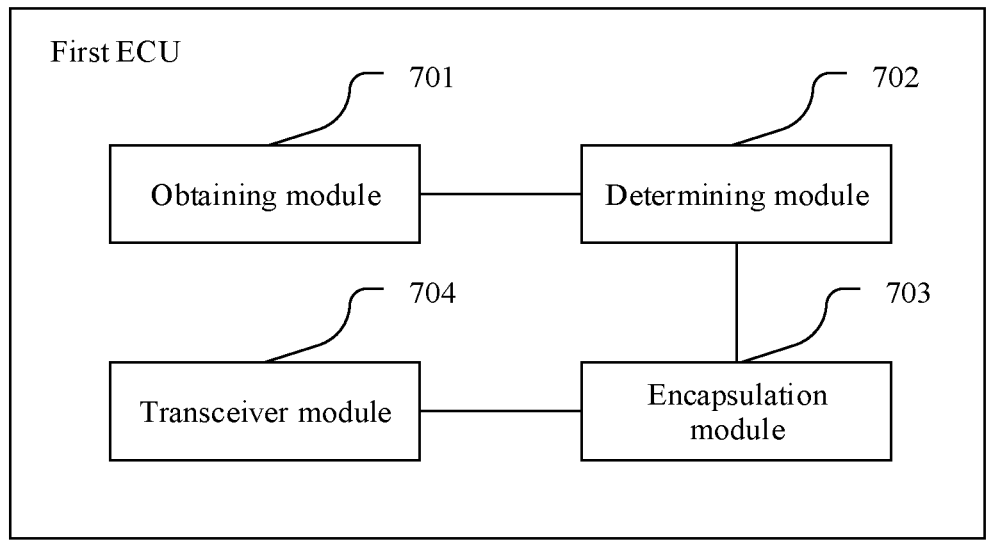
FIG. 7 is a schematic diagram of a structure of an ECU according to this disclosure.

First, refer to FIG. 7. This disclosure provides a schematic diagram of a structure of an ECU. The ECU is configured to perform the foregoing steps performed by the first ECU. The ECU provided in this disclosure shown in FIG. 7 is referred to as a first ECU below. The first ECU is applied to a vehicle. The vehicle includes a plurality of ECUs. The first ECU and a second ECU are any two ECUs of the plurality of ECUs. The plurality of ECUs is connected through Ethernet. The first ECU includes an obtaining module 701 configured to obtain to-be-sent data, a determining module 702 configured to determine a protection policy corresponding to the to-be-sent data from a plurality of protection policies, where the plurality of protection policies include a plurality of different encapsulation manners for the to-be-sent data, and the plurality of protection policies include at least two protection policies with different calculation amounts for processing the to-be-sent data, an encapsulation module 703 configured to encapsulate the to-be-sent data according to the protection policy corresponding to the to-be-sent data, to obtain an encapsulated packet, and a transceiver module 704 configured to send the encapsulated packet to the second ECU.

In a possible implementation, the determining module 702 is further configured to determine the protection policy corresponding to the to-be-sent data from the plurality of protection policies based on an identifier included in the to-be-sent data, where the identifier included in the to-be-sent data includes an identifier of an ECU that generates the to-be-sent data or an identifier of a data type of the to-be-sent data.

In a possible implementation, if the identifier included in the to-be-sent data includes the identifier of the ECU that generates the to-be-sent data, the determining module 702 is further configured to determine a security level of the to-be-sent data based on the identifier and a mapping relationship, where the mapping relationship includes a relationship between an identifier of an ECU in the vehicle and a security level, and a security level corresponding to each ECU in the vehicle is determined based on a type of the ECU in the vehicle, and determine the protection policy corresponding to the to-be-sent data from the plurality of protection policies based on the security level.

In a possible implementation, the encapsulated packet includes an identifier of the protection policy corresponding to the to-be-sent data, and the identifier of the protection policy is used by the second ECU to determine a manner of parsing the encapsulated packet.

In a possible implementation, each of the at least two protection policies includes one or more of the following policies: no protection, anti-replay attack protection, integrity protection, or confidentiality protection, where the no protection indicates that no protection is performed on the to-be-sent data, the anti-replay attack protection indicates that protection against a replay attack is performed on the to-be-sent data, the integrity protection indicates that integrity check code is generated for the to-be-sent data, where the integrity check code is used by the second ECU to check whether the encapsulated packet is complete, and the confidentiality protection indicates that encryption processing is performed on the to-be-sent data.

In a possible implementation, if the protection policy corresponding to the to-be-sent data includes the anti-replay attack protection, the encapsulated packet carries an anti-replay counter. A value of the anti-replay counter changes each time the first ECU sends a packet frame to the second ECU. In this way, the second ECU discards the encapsulated packet when the value of the anti-replay counter is not within a preset range.

If the protection policy corresponding to the to-be-sent data includes the integrity protection, the encapsulated packet includes the integrity check code, where the integrity check code is used by the second ECU to check whether data obtained by parsing the encapsulated packet is complete.

If the protection policy corresponding to the to-be-sent data includes the confidentiality protection, a payload in the encapsulated packet includes ciphertext, where the ciphertext is obtained by encrypting the to-be-sent data by using a preset encryption algorithm.

In a possible implementation, the encapsulated packet is a SOME/IP packet.

Figure 8:
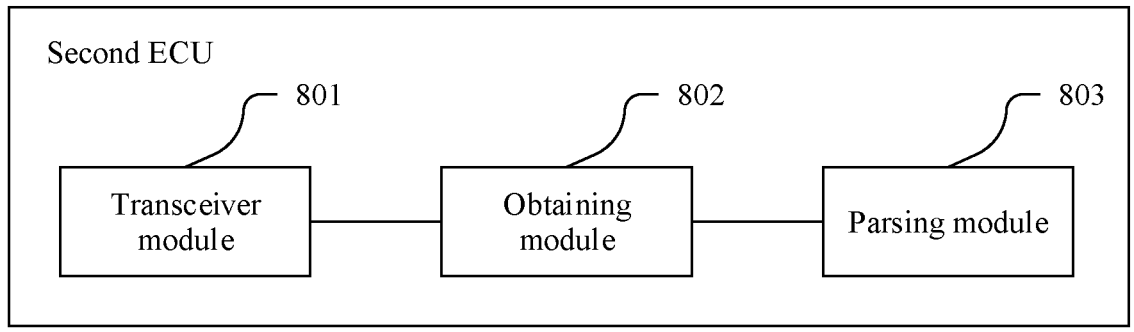
FIG. 8 is a schematic diagram of a structure of another ECU according to this disclosure.

Refer to FIG. 8. This disclosure provides a schematic diagram of a structure of another ECU. The ECU may be configured to perform the steps performed by the second ECU in the foregoing method. The other ECU shown in FIG. 8 provided in this disclosure is referred to as a second ECU below. The second ECU is applied to a vehicle. The vehicle includes a plurality of ECUs. A first ECU and the second ECU are any two of the plurality of ECUs. The second ECU may include a transceiver module 801 configured to receive an encapsulated packet sent by the first ECU, an obtaining module 802 configured to obtain a protection policy corresponding to the encapsulated packet, where the protection policy corresponding to the encapsulated packet includes an encapsulation manner used by the first ECU to obtain the encapsulated packet, and a parsing module 803 configured to parse the encapsulated packet according to the protection policy, to obtain a parsing result.

In a possible implementation, the protection policy corresponding to the encapsulated packet includes one or more of the following policies: no protection, anti-replay attack protection, integrity protection, or confidentiality protection, where the no protection indicates that no protection is performed on to-be-sent data, the anti-replay attack protection indicates that protection against a replay attack is performed on the to-be-sent data, the integrity protection indicates that integrity check code is added in the encapsulated packet, where the integrity check code is used to check, when the encapsulated packet is parsed, whether data obtained through parsing is complete, and the confidentiality protection indicates that encryption processing is performed on to-be-sent data.

In a possible implementation, if the protection policy corresponding to the encapsulated packet includes the anti-replay attack protection, a header of the encapsulated packet includes a value of an anti-replay counter. The parsing module 803 is further configured to discard the encapsulated packet if the value of the anti-replay counter included in the encapsulated packet is not within a preset range.

In a possible implementation, if the protection policy corresponding to the encapsulated packet includes the integrity protection, the encapsulated packet includes the integrity check code. The parsing module 803 is further configured to determine, with reference to the integrity check code, whether the parsing result is complete. If the parsing result is incomplete, the parsing module discards the parsing result.

In a possible implementation, if the protection policy corresponding to the to-be-sent data includes the confidentiality protection, the parsing module 803 is further configured to decrypt, with reference to a preset decryption algorithm, a payload included in the encapsulated packet, to obtain the parsing result.

In a possible implementation, the encapsulated packet includes an identifier of the protection policy corresponding to the to-be-sent data, so that the obtaining module can identify, based on the identifier, the protection policy corresponding to the encapsulated packet.

Figure 9:
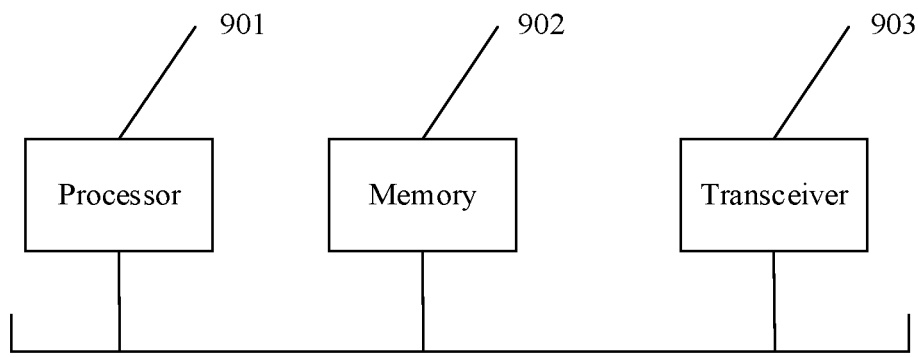
FIG. 9 is a schematic diagram of a structure of still another ECU according to this disclosure.

Refer to FIG. 9. FIG. 9 is a schematic diagram of a structure of still another ECU according to this disclosure. Details are as follows.

The ECU may include a processor 901, a transceiver 903, and a memory 902. The processor 901, the transceiver 903, and the memory 902 are interconnected through a line. The memory 902 stores program instructions and data.

The memory 902 stores the program instructions and the data that correspond to the steps in FIG. 5.

The processor 901 is configured to perform the method steps performed by the first ECU or the second ECU shown in any embodiment in FIG. 5.

The ECU may further include the transceiver 903 configured to receive or send data.

An embodiment of this disclosure further provides a computer-readable storage medium. The computer-readable storage medium stores a program used to generate a vehicle traveling velocity. When the program is run on a computer, the computer is enabled to perform the steps performed by the first ECU or the second ECU in the method described in the embodiment shown in FIG. 5.

Optionally, the ECU shown in FIG. 9 is a chip.

An embodiment of this disclosure further provides a data transmission system. The data transmission system includes at least one ECU. The at least one ECU may be configured to perform the method steps performed by the first ECU or the second ECU in any embodiment in FIG. 5.

An embodiment of this disclosure further provides a vehicle. The vehicle includes at least one ECU. The at least one ECU may be configured to perform the method steps performed by the first ECU or the second ECU in any embodiment in FIG. 5.

An embodiment of this disclosure further provides an ECU. The ECU may also be referred to as a digital processing chip or a chip. The chip includes a processing unit and a communications interface. The processing unit obtains program instructions through the communications interface. The program instructions are executed by the processing unit, and the processing unit is configured to perform the method steps performed by the first ECU or the second ECU shown in any embodiment in FIG. 5.

An embodiment of this disclosure further provides a digital processing chip. A circuit and one or more interfaces that are configured to implement the processor 901 or a function of the processor 901 are integrated into the digital processing chip. When a memory is integrated into the digital processing chip, the digital processing chip may complete the method steps in any one or more of the foregoing embodiments. When a memory is not integrated into the digital processing chip, the digital processing chip may be connected to an external memory through a communications interface. The digital processing chip implements, according to program code stored in the external memory, an action performed by the first ECU or the second ECU in the foregoing embodiment.

An embodiment of this disclosure further provides a computer program product. When the computer program product runs on a computer, the computer is enabled to perform the steps performed by the first ECU or the second ECU in the method described in the embodiment shown in FIG. 5.

The ECU provided in the embodiments of this disclosure may be a chip. The chip includes a processing unit and a communications unit. The processing unit may be, for example, a processor, and the communications unit may be, for example, an input/output interface, a pin, or a circuit. The processing unit may execute computer-executable instructions stored in a storage unit, so that the chip in a server performs the data transmission method described in the embodiment shown in FIG. 5. Optionally, the storage unit is a storage unit in the chip, for example, a register or a cache. The storage unit may alternatively be a storage unit located outside the chip in a wireless access device end, for example, a read-only memory (ROM) or another type of static storage device that can store static information and instructions, or a random-access memory (RAM).

Further, the processing unit or the processor may be a CPU, a network processor (for example, neural-network processing unit (NPU)), a graphics processing unit (GPU), a digital signal processor (DSP), an ASIC, a field-programmable gate array (FPGA), another programmable logic device, a discrete gate, a transistor logic device, a discrete hardware component, or the like. A general-purpose processor may be a microprocessor or any regular processor or the like.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected according to an actual need to achieve the objectives of the solutions of the embodiments. In addition, in the accompanying drawings of the apparatus embodiments provided in this disclosure, connection relationships between modules indicate that the modules have communication connections with each other, which may be further implemented as one or more communications buses or signal cables.

Based on the descriptions of the foregoing implementations, a person skilled in the art may clearly understand that this disclosure may be implemented by software in addition to necessary universal hardware, or certainly may be implemented by dedicated hardware, including an application-specific integrated circuit, a dedicated CPU, a dedicated memory, a dedicated component, and the like. Generally, any functions that can be performed by a computer program can be easily implemented by using corresponding hardware, and a specific hardware structure used to achieve a same function may be of various forms, for example, in a form of an analog circuit, a digital circuit, or a dedicated circuit. However, in this disclosure, a software program implementation is a better implementation in most cases. Based on such an understanding, the technical solutions of this disclosure essentially or the part contributing to the conventional technology may be implemented in a form of a software product. The computer software product is stored in a readable storage medium, such as a floppy disk, a Universal Serial Bus (USB) flash drive, a removable hard disk, a ROM, a RAM, a magnetic disk, or an optical disc of a computer, and includes several instructions for instructing a computer device (which may be a personal computer, a server, a network device, or the like) to perform the methods described in the embodiments of this disclosure.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or the functions according to the embodiments of this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

In this disclosure, terms such as "first", "second", "third", and "fourth" (if exists) in the specification, the claims, and the accompanying drawings are intended to distinguish between similar objects but do not necessarily indicate a specific order or sequence. It should be understood that data termed in such a way is interchangeable in appropriate circumstances, so that the embodiments described herein can be implemented in other orders than the content illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

What is claimed is:

1. A data transmission method, comprises:
    obtaining, by a first electronic control unit (ECU) of a vehicle, to-be-sent data;
    selecting, by the first ECU, a protection policy corresponding to the to-be-sent data from a plurality of protection policies based on a mapping relationship between an identifier comprised in the to-be-sent data and a security level of the to-be-sent data, wherein the identifier is of an ECU associated with a data type of the to-be-sent data, wherein the plurality of protection policies comprise a plurality of different encapsulation manners for the to-be-sent data, and wherein the plurality of protection policies comprise at least two protection policies with different calculation amounts for processing the to-be-sent data;
    encapsulating, by the first ECU, the to-be-sent data according to the protection policy corresponding to the to-be-sent data, to obtain an encapsulated packet, wherein the encapsulated packet comprises a second identifier of the protection policy for the to-be-sent data, and wherein the second identifier is for identifying the security level for the to-be-sent data in the encapsulated packet; and
    sending, by the first ECU, the encapsulated packet to a second ECU of the vehicle.

2. The data transmission method of claim 1, wherein the encapsulated packet comprises a second identifier of the protection policy corresponding to the to-be-sent data, and wherein the second identifier is for selecting a manner of parsing the encapsulated packet.

3. The data transmission method of claim 1, further comprising selecting, by the first ECU, the protection policy corresponding to the to-be-sent data from the plurality of protection policies based on the identifier comprised in the to-be-sent data comprises:
    selecting, by the first ECU, a security level of the to-be-sent data based on the identifier and a second mapping relationship, wherein the second mapping relationship comprises a relationship between a third identifier of an ECU in the vehicle and a second security level, and wherein a security level corresponding to each ECU in the vehicle is based on a type of the each ECU in the vehicle; and
    selecting, by the first ECU, the protection policy corresponding to the to-be-sent data from the plurality of protection policies based on the security level.

4. The data transmission method of claim 1, wherein each of the at least two protection policies comprises policies associated with at least one of no protection, anti-replay attack protection, integrity protection, or confidentiality protection, wherein the no protection indicates that no protection is performed on the to-be-sent data, wherein the anti-replay attack protection indicates that protection against a replay attack is performed on the to-be-sent data, wherein the integrity protection indicates that integrity check code is generated for the to-be-sent data, wherein the integrity check code is for checking whether the encapsulated packet is complete, and wherein the confidentiality protection indicates that encryption processing is performed on the to-be-sent data.

5. The data transmission method of claim 1, wherein the encapsulated packet is a Scalable service-Oriented MiddlewarE over IP (SOME/IP) packet.

6. A data transmission method, comprising:
receiving, by a second electronic control unit (ECU) of a vehicle, an encapsulated packet from a first ECU of the vehicle;
obtaining, by the second ECU, a protection policy corresponding to the encapsulated packet, wherein the protection policy corresponding to the encapsulated packet comprises an encapsulation manner of the first ECU for obtaining the encapsulated packet, wherein the encapsulated packet comprises an identifier of the protection policy for the encapsulated packet, and wherein the identifier of the protection policy is used by the second ECU to identify the security level of data in the encapsulated packet and to identify a manner of parsing the encapsulated packet; and
parsing, by the second ECU, the encapsulated packet according to the protection policy, to obtain a parsing result.

7. The data transmission method of claim 6, wherein the protection policy corresponding to the encapsulated packet comprises at least one of no protection, anti-replay attack protection, integrity protection, or confidentiality protection, wherein the no protection indicates that no protection is performed on to-be-sent data, wherein the anti-replay attack protection indicates that protection against a replay attack is performed on the encapsulated packet, wherein the integrity protection indicates that integrity check code is added in the encapsulated packet, wherein the integrity check code for checking whether data obtained through parsing is complete when the encapsulated packet is parsed, and wherein the confidentiality protection indicates that encryption processing is performed on the encapsulated packet.

8. A first electronic control unit (ECU), applied to a vehicle having the first ECU and a second ECU, wherein the first ECU comprises:
a memory configured to store program instructions; and
at least one processor coupled to the memory and configured to execute the program instructions to cause the first ECU to:
obtain to-be-sent data;
select a protection policy corresponding to the to-be-sent data from a plurality of protection policies based on a mapping relationship between an identifier in the to-be-sent data and a security level of the to-be-sent data, wherein the identifier is of an ECU associated with a data type of the to-be-sent data, wherein the plurality of protection policies comprise a plurality of different encapsulation manners for the to-be-sent data, and wherein the plurality of protection policies comprise at least two protection policies with different calculation amounts for processing the to-be-sent data;
encapsulate the to-be-sent data according to the protection policy corresponding to the to-be-sent data, to obtain an encapsulated packet, wherein the encapsulated packet comprises a second identifier of the corresponding to the to-be-sent data, and wherein the second identifier is for identifying the security level for the to-be-sent data in the encapsulated packet; and
send the encapsulated packet to the second ECU.

9. The first ECU of claim 8, wherein the encapsulated packet comprises a second identifier of the protection policy corresponding to the to-be-sent data, and wherein the second identifier is for selecting a manner of parsing the encapsulated packet.

10. The first ECU of claim 8, wherein the program instructions, when executed by the at least one processor, further causes the first ECU to:
select a security level of the to-be-sent data based on the identifier and a second mapping relationship, wherein the second mapping relationship comprises a relationship between a third identifier of an ECU in the vehicle and a second security level, and a security level corresponding to each ECU in the vehicle is determined based on a type of the each ECU in the vehicle; and
select the protection policy corresponding to the to-be-sent data from the plurality of protection policies based on the security level.

11. The first ECU of claim 8, wherein each of the at least two protection policies comprises policies associated with at least one of no protection, anti-replay attack protection, integrity protection, or confidentiality protection, wherein the no protection indicates that no protection is performed on the to-be-sent data, wherein the anti-replay attack protection indicates that protection against a replay attack is performed on the to-be-sent data, wherein the integrity protection indicates that integrity check code is generated for the to-be-sent data, wherein the integrity check code is for checking whether the encapsulated packet is complete, and wherein the confidentiality protection indicates that encryption processing is performed on the to-be-sent data.

12. The first ECU of claim 8, wherein the encapsulated packet is a Scalable service-Oriented MiddlewarE over IP (SOME/IP) packet.

13. A second electronic control unit (ECU) of a vehicle having a first ECU and the second ECU, wherein the second ECU comprises:
a memory configured to store program instructions; and
at least one processor coupled to the memory and configured to execute the program instructions to cause the second ECU to:
receive an encapsulated packet from the first ECU;
obtain a protection policy corresponding to the encapsulated packet, wherein the protection policy corresponding to the encapsulated packet comprises an encapsulation manner of the first ECU for obtaining the encapsulated packet, wherein the encapsulated packet comprises an identifier of the protection policy for the encapsulated packet, and wherein the identifier of the protection policy is used by the second ECU to identify the security level of data in the encapsulated packet and to identify a manner of parsing the encapsulated packet; and
parse the encapsulated packet according to the protection policy, to obtain a parsing result.

14. The second ECU of claim 13, wherein the protection policy corresponding to the encapsulated packet comprises policies associated with at least one of no protection, anti-replay attack protection, integrity protection, or confidentiality protection, wherein the no protection indicates that no protection is performed on to-be-sent data, wherein the anti-replay attack protection indicates that protection against a replay attack is performed on the encapsulated packet, wherein the integrity protection indicates that integrity check code is added in the encapsulated packet, wherein the integrity check code is used to check whether data obtained through parsing is complete when the encapsulated packet is parsed, and wherein the confidentiality protection indicates that encryption processing is performed on the encapsulated packet.

15. A vehicle comprising:
a first electronic control unit (ECU); and
a second ECU coupled to the second ECU, wherein the first ECU is configured to:
  obtain to-be-sent data;
  select a protection policy corresponding to the to-be-sent data from a plurality of protection policies based on a mapping relationship between an identifier in the to-be-sent data and a security level of the to-be-sent data, wherein the identifier is of an ECU associated with a data type of the to-be-sent data, wherein the plurality of protection policies comprise a plurality of different encapsulation manners for the to-be-sent data, and wherein the plurality of protection policies comprise at least two protection policies with different calculation amounts for processing the to-be-sent data;
  encapsulate the to-be-sent data according to the protection policy corresponding to the to-be-sent data, to obtain an encapsulated packet, wherein the encapsulated packet comprises a second identifier of the protection policy for the to-be-sent data, and wherein the second identifier is for identifying the security level for the to-be-sent data in the encapsulated packet; and
  send the encapsulated packet to the second ECU.

16. The vehicle of claim 15, wherein the encapsulated packet is a Scalable service-Oriented MiddlewarE over IP (SOME/IP) packet.

17. The vehicle of claim 15, wherein the first ECU is further configured to:
  select a security level of the to-be-sent data based on the identifier and a second mapping relationship, wherein the second mapping relationship comprises a relationship between a third identifier of an ECU in the vehicle and a second security level, and a security level corresponding to each ECU in the vehicle is determined based on a type of the each ECU in the vehicle; and
  select the protection policy corresponding to the to-be-sent data from the plurality of protection policies based on the security level.

18. The vehicle of claim 15, wherein each of the at least two protection policies comprises policies associated with at least one of no protection, anti-replay attack protection, integrity protection, or confidentiality protection, wherein the no protection indicates that no protection is performed on the to-be-sent data, wherein the anti-replay attack protection indicates that protection against a replay attack is performed on the to-be-sent data, wherein the integrity protection indicates that integrity check code is generated for the to-be-sent data, wherein the integrity check code is for checking whether the encapsulated packet is complete, and wherein and the confidentiality protection indicates that encryption processing is performed on the to-be-sent data.

* * * * *